United States Patent [19]
Shaw

[11] 3,831,308
[45] Aug. 27, 1974

[54] FISHING LINE ATTACHMENT

[76] Inventor: Avey Shaw, 52 Leed St., Huntington Station, N.Y. 11746

[22] Filed: Sept. 7, 1972

[21] Appl. No.: 286,580

[52] U.S. Cl............................. 43/43.13, 43/44.97
[51] Int. Cl...................... A01k 91/02, A01k 95/00
[58] Field of Search............ 43/43.13, 44.97, 42.22, 43/42.23, 42.36

[56] References Cited
UNITED STATES PATENTS

| | | | |
|---|---|---|---|
| 2,115,302 | 4/1938 | Chochard | 43/43.13 |
| 2,201,082 | 5/1940 | Dobbins et al. | 43/43.13 |
| 2,535,211 | 12/1950 | Jelinek | 43/42.23 X |
| 2,557,516 | 6/1951 | Schipper | 43/42.22 UX |
| 2,577,965 | 12/1951 | Hinkson | 43/43.13 |
| 2,714,779 | 8/1955 | Heiner | 43/42.23 |
| 2,762,156 | 9/1956 | Takeshita | 43/42.23 |
| 3,543,431 | 12/1970 | Olds | 43/43.13 |

Primary Examiner—James H. Czerwonky
Attorney, Agent, or Firm—Bauer & Amer

[57] ABSTRACT

A fishing line attachment having a longitudinally extending body and which in one orientation causes surfacing movement and an opposite orientation diving movement. The attachment is thus selectively advantageously used during trolling and casting to properly position the terminal or fishing end of the line during said fishing activities. It also has utility as a lure and sinker. The body has two pairs of spaced-apart wings mounted thereon which extend outward from and beyond opposite sides of the body. Each wing has first and second edge portions which cause the reversible motion in response to line tension.

5 Claims, 8 Drawing Figures

PATENTED AUG 27 1974　　　　　　　　　　　　　　3,831,308

FISHING LINE ATTACHMENT

The present invention relates generally to a fishing line attachment, the objects and advantages of which reside in the facilitated manner in which it contributes to proper positioning of the fishing end of the line containing the hooks, lures, or other similar devices.

Various devices which have lateral wings or similar structure have been proposed for use on fishing lines to raise or lower the fishing end to a selected depth. These devices, without exception, lack a requisite simplicity which would contribute to an optimum minimum interference with fishing activities, and also which would facilitate use thereof. It is obvious, for example, that complicated settings and adjustments on such devices are difficult to achieve on fishing boats at sea, in cramped quarters, or under other such adverse circumstances.

Broadly, it is an object of the present invention to provide an improved fishing line positioning attachment overcoming the foregoing and other shortcomings of the prior art. Specifically, it is an object to provide a sinker-type attachment having said positioning utility merely upon attachment in a selected orientation adjacent the fishing end of the fishing line.

A fishing line attachment demonstrating objects and advantages of the present invention includes a sinker-type body having first and second loop-tying structures respectively located adjacent opposite ends thereof. The selection of one said loop for attachment to the supply length of the fishing line in leading relation to the other loop establishes an orientation for angled wings on said body which contributes either to diving or surfacing movement in said body. Thus, the attachment facilitates casting with said surfacing movement and trolling with said diving movement automatically as a function of its orientation as attached to said fishing line.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 4:
Figure 5:
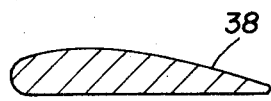
Figure 6:
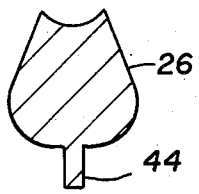
Figure 1:
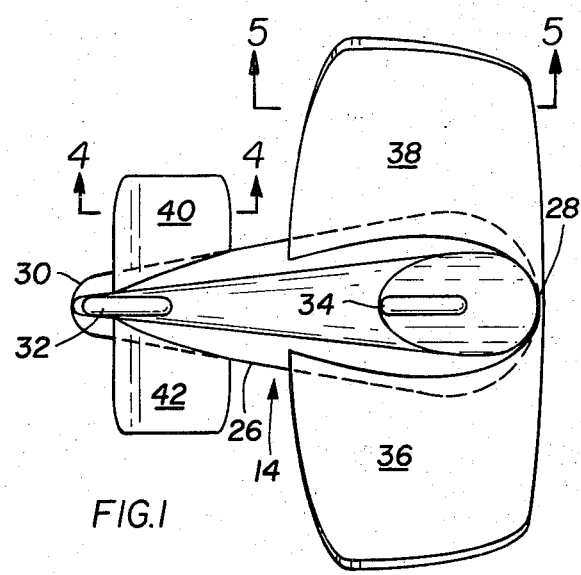
FIG. 1 is a plan view of a trolling and casting fishing line attachment according to the present invention.
Figure 3:
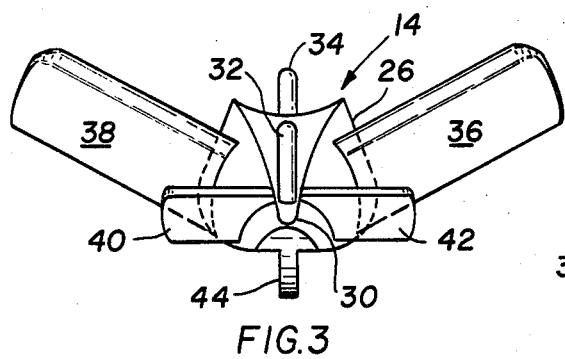
FIG. 3 is an end elevational view as seen from the left of FIG. 1.
Figure 2:
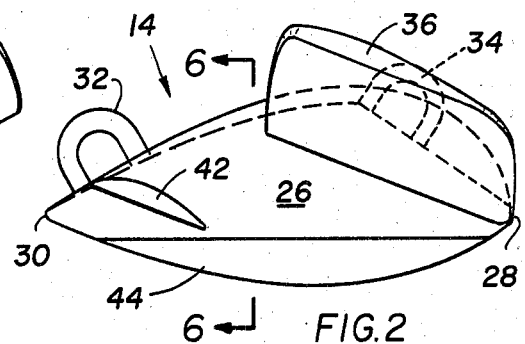
FIG. 2 is a side elevational view illustrating further structural features thereof.
Figure 7:
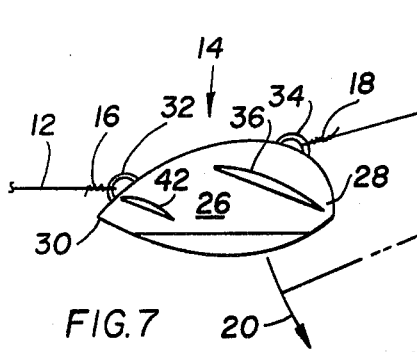
Figure 8:
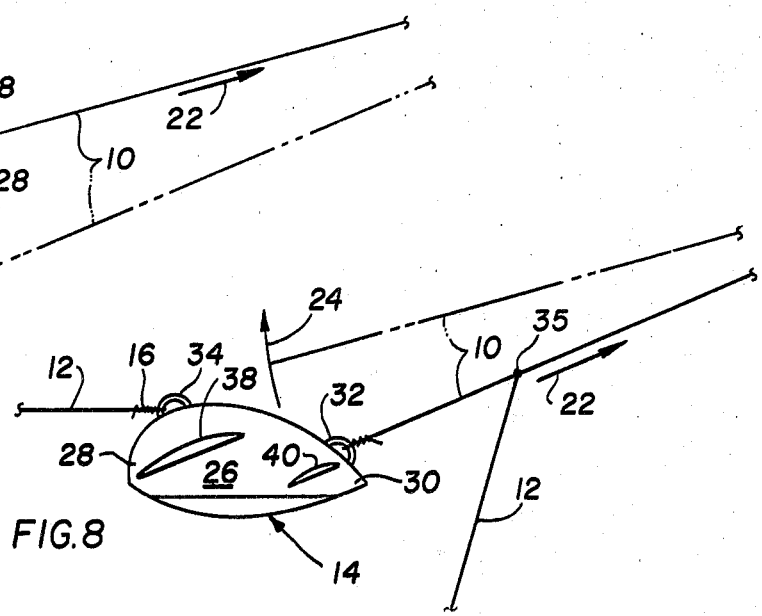

FIGS. 4, 5 and 6 are elevational views in section respectively taken on lines 4—4 and 5—5 of FIG. 1 and on line 6—6 of FIG. 2; and FIGS. 7 and 8 are side elevational views illustrating the two contemplated ways of using the attachment hereof, FIG. 7 illustrating use during trolling and the manner in which the attachment contributes to diving to position the end of the fishing line, and FIG. 8 the use thereof during casting and the manner in which the attachment contributes to surfacing to position the end of the fishing line.

Reference is now made to the drawings, and in particular to FIGS. 7 and 8. Illustrated in these figures is fishing line lengths 10 and 12, length 10 designating the supply length of the fishing line whose remote end (not illustrated) will be understood to be supported on the fishing pole or the like, whereas length 12 is the terminal end of the fishing line whose remote end (also not shown) will be understood to be attached to the fishing hooks, lures, or other such devices. The fishing line attachment of the present invention, generally designated 14, occupies an operative position between the fishing line lengths 10 and 12, being attached thereto by a knot or the like, as at 16 and 18. As will be explained in detail subsequently, attachment 14 when arranged as illustrated in FIG. 7 undergoes diving movement 20 during directional movement 22 through the water. It is contemplated that directional movement 22 will be the result of trolling, and thus movement of the fishing boat in the direction 22. As generally understood, during trolling, it is advantageous to maintain the fishing or terminal end 12 of the fishing line 10 well below the surface of the water, and thus diving movement 20 of the attachment 14 favorably contributes to achieving this objective. During trolling, the fishing hooks can be directly attached at 32.

FIG. 8 depicts casting activity using the attachment 14. In this contemplated use, the orientation of attachment 14 is modified, as illustrated and as will be explained subsequently, and such modified orientation results in surfacing movement 24 in attachment 14 in response to directional movement 22. Surfacing movement 24, in an obvious manner, is advantageous during casting, since it effectively raises the fishing line end 12 to the surface of the water, and thus keeps the same clear of rocks and off of the surface beneath the water, as the fishing line end 12 is being reeled in at the completion of each cast by the fisherman.

The structural features of the attachment 14 which selectively provide either diving or surfacing movements 20 or 24, respectively, are shown in FIGS. 1–6, to which reference is now made. Specifically, attachment 14 includes a body 26 preferably fabricated of a comparatively heavy metal, such as lead, so that the attachment 14 can also effectively serve as a sinker. To this end, body 26 has an enlarged end 28 of a sufficient mass or bulk to provide the requisite sinker weight. The opposite body end 30 has less mass and comprises a streamlined shape formed by converging curved surfaces, as shown. A depending rudder 44 is helpful in maintaining the movement of body 26 on course during its directional movement 22.

To facilitate making the fishing line attachments 16 and 18, attachment 14 includes as an integral part of its body 26 a pair of closed looped constructions 32 and 34 adjacent its opposite ends.

Completing the attachment 14 are a large pair of laterally projecting wings 36 and 38 adjacent the large end 28, and adjacent the small end 30 a smaller pair of laterally projecting wings 40 and 42. As is perhaps best illustrated in FIGS. 4, 5, the wings preferably have an aerodynamic shape in cross-section, as indicated by the illustrated wings 38 and 40. The significant aspect of the pair of wings is that they are oriented, preferably at an angle of approximately 30°, to the horizontal, as illustrated, for example, in FIG. 2. It is this angular orientation which contributes to the previously noted diving and surfacing movements 20 and 24, respectively. That is, when attachment 14 is arranged with loop 34 in leading relation to loop 32 (FIG. 7), the angular orientation of both pairs of wings is downwardly directed in relation to the directional movement 22 so as to produce dividing movement 20 which, as already noted, properly positions the fishing line end 12 during trolling.

To adopt the attachment 14 for casting, it is disconnected from the fishing line and reoriented so that the loop 32 is connected to the fishing line supply length 10 and is in leading relation to the connection at loop 34, as illustrated in FIG. 8. In the just described orientation of attachment 14, the angular orientation of the wings is generally upward in relation to the directional movement 22, and thus produces the corresponding movement in an upward direction 24. As already noted, during casting it is desirable that there be surfacing movement 24 in the fishing line end 12 during reeling in of the supply length 10.

During casting or surfing, i.e., fishing from the shore, an additional or alternative connection location for the hooks is at the FIG. 8 location 35. The line 10 is cast into the water and allowed to rest on the bottom so that device 14 acts like a sinker. When reeling in, the operator tugs on the line 10 and the rising device 14 clears the hooks from obstacles on the bottom.

From the foregoing, it should also be apparent that when the hooks are attached directly at 34, the device 14 functions effectively as a lure, wherein the rising movement 24 therein never allows the fishing end of line 10 to settle to the bottom.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A reversible fish lure and sinker comprising a longitudinally extending body of non-buoyant material tending normally to sink and having upper and lower surfaces,
    said body having a larger mass at one end and tapering smoothly substantially to a point and having less mass at the other end,
    and two pairs of wings mounted on and relatively spaced from each other along the length of said body and projecting laterally outward from and beyond opposite sides of said body,
    means mounted on said body to move the same in opposite directions,
    and said wings each having a first edge portion thereon directed downward relative to the horizontal in one direction of movement of said body to cause said body to dive and said wings each having a second edge portion thereon directed upward relative to the horizontal in the opposite direction of movement of said body to cause the same to rise.

2. A reversible fish lure and sinker as in claim 1, said body having upper and lower surfaces, and rudder means depending downward from and along the length of said lower surface of said body between said pairs of wings to maintain said body in its direction of movement.

3. A reversible fish lure and sinker comprising a longitudinally extending body of non-buoyant material tending normally to sink and having upper and lower surfaces,
    said body having a larger mass at one end and tapering smoothly substantially to a point and having less mass at the other end,
    and two pairs of wings mounted on and relatively spaced from each other along the length of said body and projecting laterally outward from and beyond opposite sides of said body,
    means mounted on said body to move the same in opposite directions,
    and said wings each having a first edge portion thereon directed downward relative to the horizontal in one direction of movement of said body to cause said body to dive and said wings each having a second edge portion thereon directed upward relative to the horizontal in the opposite direction of movement of said body to cause the same to rise,
    one of said pairs of wings projecting at an angle upward from the horizontal,
    the other of said pairs of wings projecting substantially horizontally outward from said body.

4. A reversible fish lure and sinker comprising a longitudinally extending body of non-buoyant material tending normally to sink and having upper and lower surfaces,
    said body having a larger mass at one end and tapering smoothly substantially to a point and having less mass at the other end,
    and two pairs of wings mounted on and relatively spaced from each other along the length of said body and projecting laterally outward from and beyond opposite sides of said body,
    means mounted on said body to move the same in opposite directions,
    and said wings each having a first edge portion thereon directed downward relative to the horizontal in one direction of movement of said body to cause said body to dive and said wings each having a second edge portion thereon directed upward relative to the horizontal in the opposite direction of movement of said body to cause the same to rise,
    said pairs of wings each being spaced along the length of said body with one of said pairs of wings projecting outward from opposite sides of said larger body mass and another of said pairs of wings projecting outward from opposite sides of the lesser body mass,
    said one pair of wings extending along said body for a length greater than the other of said pairs of wings and projecting outward from said body to an extent greater than said other of said pairs of wings.

5. A reversible fish lure and sinker as in claim 4, said wings of one of said pairs being at an upward angle to the horizontal to said body in their projection outward from said body and the wings of the other of said pairs of wings projecting substantially horizontally outward from said body.

* * * * *